United States Patent
Hunter, Jr.

(10) Patent No.: US 6,758,874 B1
(45) Date of Patent: Jul. 6, 2004

(54) ROTATING FILTER FEATURE FOR WET/DRY VACUUM CLEANER

(76) Inventor: John P. Hunter, Jr., 344 Country Rd. 39A, Southampton, NY (US) 11968

(*) Notice: Subject to any disclaimer, the term of this patent is extended or adjusted under 35 U.S.C. 154(b) by 0 days.

(21) Appl. No.: 10/434,829

(22) Filed: May 9, 2003

(51) Int. Cl.[7] .............................................. B01D 46/02
(52) U.S. Cl. ...................... 55/337; 55/459.1; 55/459.2; 55/459.4; 55/473; 55/520; 55/302; 55/DIG. 3; 15/352; 15/353
(58) Field of Search ...................... 55/302, 337, 459.1, 55/459.2, 459.4, 473, 520, DIG. 3, 392, 291, 293, 459.3; 15/352, 353

(56) References Cited

U.S. PATENT DOCUMENTS

| | | | | |
|---|---|---|---|---|
| 4,221,577 A | * | 9/1980 | Lowrie | 55/392 |
| 4,547,927 A | | 10/1985 | Berfield | 15/327 |
| 5,069,696 A | | 12/1991 | Bruno, III | 55/476 |
| 5,188,644 A | * | 2/1993 | Landy | 55/337 |
| 5,741,351 A | * | 4/1998 | Beal et al. | 95/279 |
| 6,381,803 B1 | | 5/2002 | Berfield et al. | 15/330 |
| 6,521,006 B2 | * | 2/2003 | Park et al. | 55/337 |
| 6,613,129 B2 | * | 9/2003 | Gen | 95/269 |

* cited by examiner

*Primary Examiner*—Minh-Chau T. Pham
(74) *Attorney, Agent, or Firm*—Alfred M. Walker

(57) ABSTRACT

A wet/dry vacuum cleaner includes a debris collection drum having a top opening and a power head covering the top opening of the collection drum, which has an inlet and an outlet. A rotating filter filters dust laden air and is suspended from the power head extending into the collection drum. The power head has an impeller to draw dust laden air, through the inlet, into the collection drum, through the filter, to remove particulate from the dust laden air and to discharge the filtered air through the outlet. The impeller is driver by an electric motor. A stationary blade within the collection drum scrapes an outer surface of the rotating filter, while rotating, to remove accumulated globs of debris from the outer surface of the filter and drop the debris into the collection drum.

16 Claims, 3 Drawing Sheets

ROTATING FILTER FEATURE FOR WET/DRY VACUUM CLEANER

FIELD OF THE INVENTION

The present invention relates to cleaning filters of wet/dry vacuum cleaners, and preventing clogging thereto.

BACKGROUND OF THE INVENTION

Single-stage wet/dry vacuum cleaners, known in the trade as "SHOP VACS®" have evolved into a fairly standard design including a removable power head atop a debris collection drum. A cylindrical pleated-paper disposable filter is fitted onto a perforated cylindrical tube, which is the air intake of a motor driven impeller housing. Typically, this tube is axially aligned with the impeller motor shaft. These high powered vacuum cleaners are quite efficient and can handle a wide variety of dust and debris types commonly encountered on a shop or industrial plant floor, or on a construction or remodelling site.

When handling certain types of large low-density particles or tufts, however, the filter gets clogged often with agglomerations of debris on the outer surface of the filter. This reduces air flow and impedes the effectiveness of the wet/dry vacuum cleaner (SHOP VAC®) necessitating frequent manual cleaning of the surface of the filter or its replacement with a new one. Debris from fiberglass insulation, fabric handling, and sawdust are common culprits. In the case of some softwood sawdust, the vacuum induced agglomerate on the filter surface is actually an agglutinate mediated by the resins in the wood.

OBJECTS OF THE INVENTION

It is therefore an object of the present invention to provide a filter for a wet/dry vacuum cleaner (SHOP VAC®) which does not clog easily.

It is yet another object of the present invention to provide a wet/dry vacuum cleaner (SHOP VAC®) filter, which is cleaned during rotating use.

It is yet another object of the present invention to clean a wet/dry vacuum cleaner (SHOP VAC®) filter during use, without damaging the filter.

It is a further object to improve over the disadvantages of the prior art.

SUMMARY OF THE INVENTION

In keeping with these objects and others which may become apparent, the present invention includes a self cleaning rotating filter for a wet/dry vacuum cleaner (such as, but not limited to those sold under the tradename SHOP VAC®).

The rotating filter feature of this invention addresses the problem of rapid surface contamination and clogging of the filter surface by certain types of debris. The outward appearance and general internal operation of the wet/dry vacuum cleaner (SHOP VAC®) is retained, however, the filter is now rotated past a stationary elastomeric blade or brush with stiff bristles which mechanically removes the majority of the surface globs automatically thereby lengthening the service interval for effective operation. Most of the debris removed by the blade or brush simply falls down into the debris collection drum in a denser larger glob.

In the first embodiment, the impeller driving shaft of the motor is extended through the perforated tube concentric with the filter so that it drives a speed reduction gearbox at its distal end, which, in turn, rotates the filter at a slow speed. Direct drive at impeller speed would tend to subject the filter to stresses, which would tend to make it billow and cause undue friction against the elastomeric blade or brush. Also, this high speed rotation of the filter would interfere with the normal desired air flow.

In the preferred embodiment, the filter is rotated at a more desirable very low speed of the order of 10 revolutions per minute. Although difficult or expensive to achieve through mechanical reduction of the speed of the impeller motor; this is a simple application of a separate timing gearmotor. This embodiment also precludes the need to extend the impeller motor shaft. The latter has the undesirable propensity for unbalancing the impeller motor and thereby introducing vibration. Alternate methods of coupling the impeller motor to a gearbox complicate the air flow geometry or introduce other mechanical complications such as belt or external gear drives in a dusty environment.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE DRAWINGS

Figure 1:
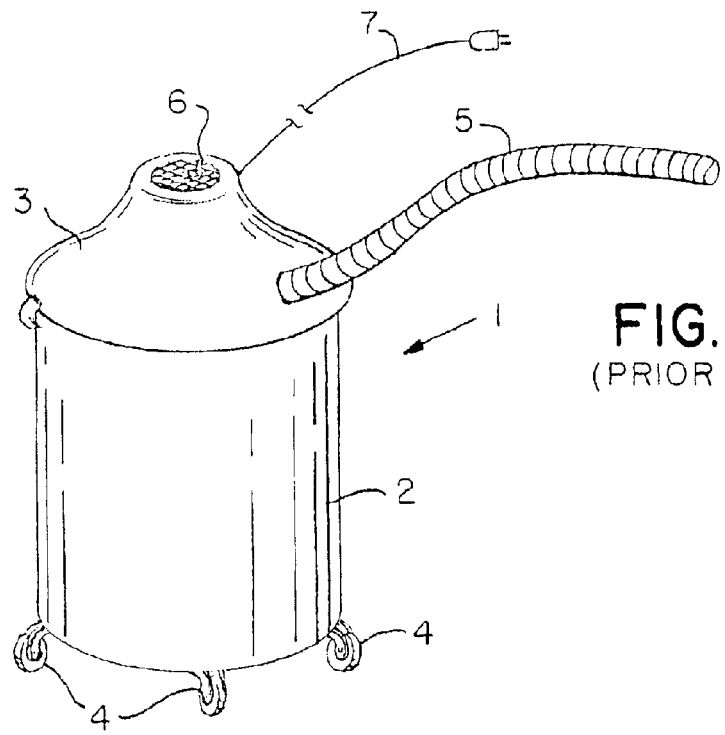
FIG. 1 is a perspective view of a wet/dry vacuum cleaner of the prior art and of this invention (which has no external modifications)
Figure 2:
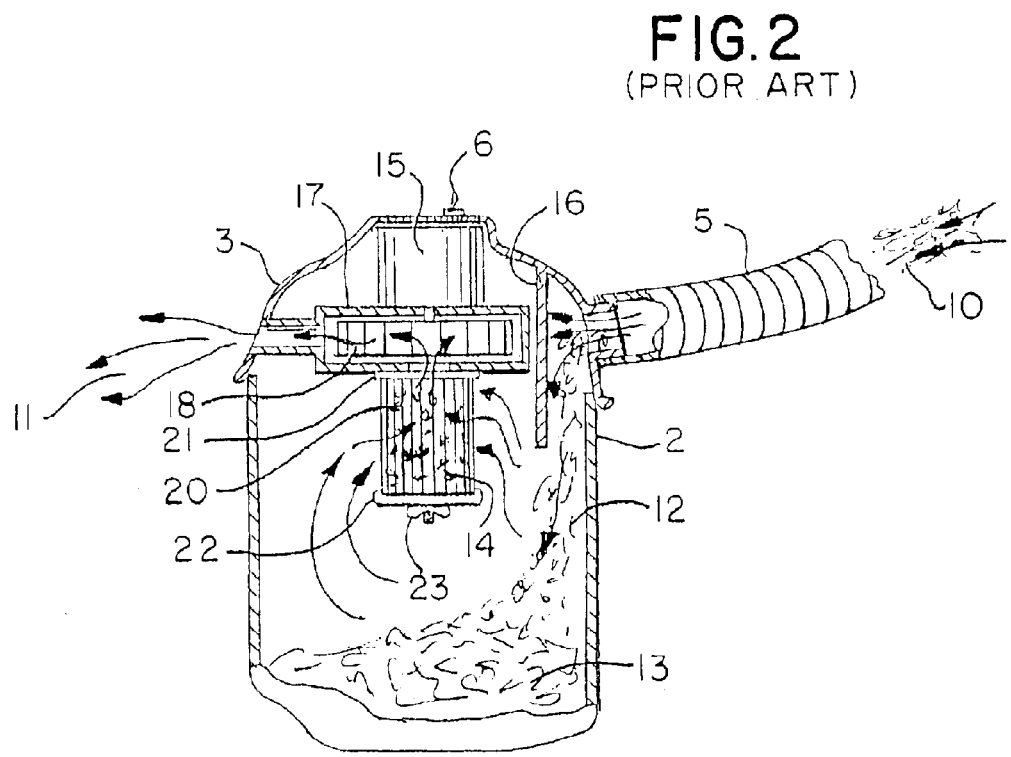
FIG. 2 is an internal side view in partial crossection of a prior art wet/dry vacuum cleaner.

FIG. 1 shows a typical wet/dry vacuum cleaner 1 with power head 3, debris collection drum 2, optional casters 4, inlet vacuum hose 5, power switch 6, and power cord with plug 7. None of these external features are modified by this invention. The internal side view of a prior art wet/dry vacuum cleaner (such as a SHOP VAC®) shows the arrangement of its major components. All rotating machinery is attached to power head 3. Motor 15 spins impeller 18 within impeller housing 17 creating a vacuum, which pulls air through filter 20 into the bottom center of impeller housing 17. This vacuum pulls in debris laden air 10 through inlet vacuum hose 5 which hits impingement barrier 16 whereby dense debris and water droplets are separated from the air flow and drop down 12 into a debris pile 13 at the bottom of collection drum 2. Air with entrained fine dust and larger less dense debris enter the filter 20 surface which entraps most of it so that essentially clean air 11 emerges from the outlet.

In the course of operation, globs of these larger less dense particles or tufts 14 accumulate on the outer surface of filter 20. Filter 20 is replaced by unscrewing wing nut 23, removing cover 22 and then sliding off soiled filter 20 from the central perforated cylinder. Filter 20 has an integral static seal 21 at impeller housing 17. A new filter is then installed in its place. The present invention does not alter the air flow and general operation described.

In the prior art, the central perforated cylinder on which filter 20 is installed is a fixed structure either attached to or extending from impeller housing 17.

Figure 3:
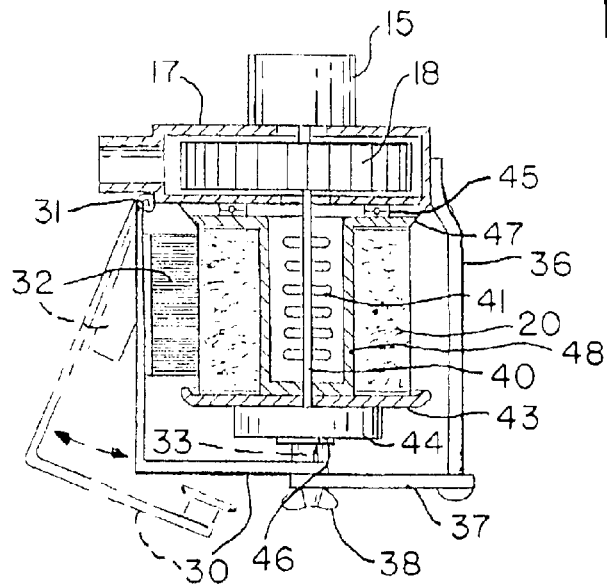
FIG. 3 is a side view (in partial central crossection) of the rotating filter feature of this invention.

As shown in the rotating filter modification of FIG. 3 of the present invention, filter support cylinder 48 with perforations 41 has become a rotatable structure by the addition of ring thrust bearing 45 (shown in crossection) which now attaches cylinder 48 to impeller housing 17. A rotating elastomeric seal 47 seals the base flange of cylinder 48 to the bottom of impeller housing 17. The shaft of motor 15 has been extended 40 beyond the end of cylinder 48. The distal end of shaft 40 is splined. Filter cap 43 is now attached to speed reduction gear box 44.

Figure 5:
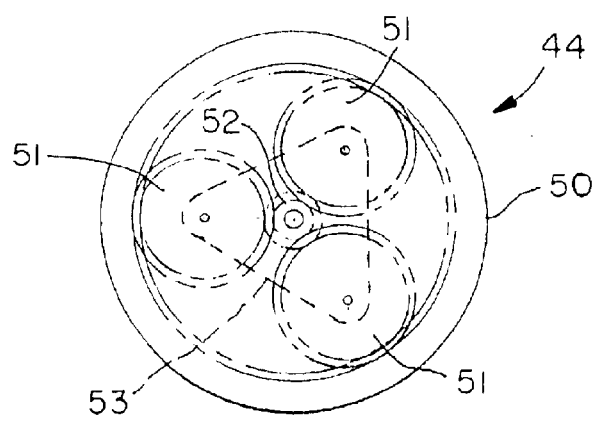
FIG. 5 is an internal plan view of a two-stage planetary gearbox of approximately 7:1 reduction ratio.

While other rotating mechanisms may be provided, a planetary gearbox of general design shown in FIG. 5 is preferable. Sun gear 52 is a small diameter pinion gear with a ribbed central hole that mates with the splined distal end of shaft 40. It drives three planet gears 51 which are held together via spider 53 (shown as a dashed outline for clarity). Planet gears 51, in turn, turn ring gear 50, which becomes the output of this two-stage gear box if spider 53 is prevented from turning. After a filter 20 is installed on cylinder 48, cap 43 (with attached gearbox 44) is fitted on its end engaging shaft 40 with sun gear 52; then bracket 30 is swung over such that stud 33 engages a short splined shaft attached to the center of spider 53 preventing it from turning. At this point, arm 37 (on post 36) is swung over and attached by screwing captive thumb screw 38 into stud 33.

Figure 4:
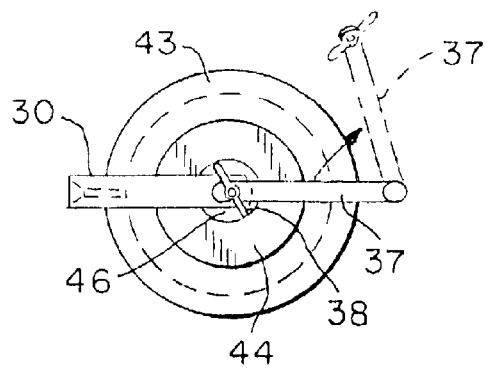
FIG. 4 is a bottom view of rotating filter feature of FIG. 3.

The bottom view of FIG. 4 details the movement of arm 37 of the present invention. Arm 37 puts compression spring force on filter 20 keeping it snug on column 48 base flange. The vertical portion of bracket 30, which is hinged at 31, carries elastomeric blade or brush 32 which is placed at the edge of filter 20 when assembled. Thus, when filter 20 is rotated, blade 32 will scrape away any accumulated globs of debris. The housing of gearbox 44 is attached to ring gear 50; this housing has a hole on its inside flat surface facing filter 20 to permit penetration of shaft 40. This housing also has a hole on the outer flat surface to permit penetration of the short splined shaft attached to spider 53 (not shown). A dust seal 46 is attached to stud 33 to seal gearbox 44. With a two-speed gearbox as shown, a ratio of up to 10:1 speed reduction can be achieved. A more complex design is required for a higher ratio. With a 10:1 ratio, a marginally high several hundred RPM filter rotational speed is achieved.

Figure 6:
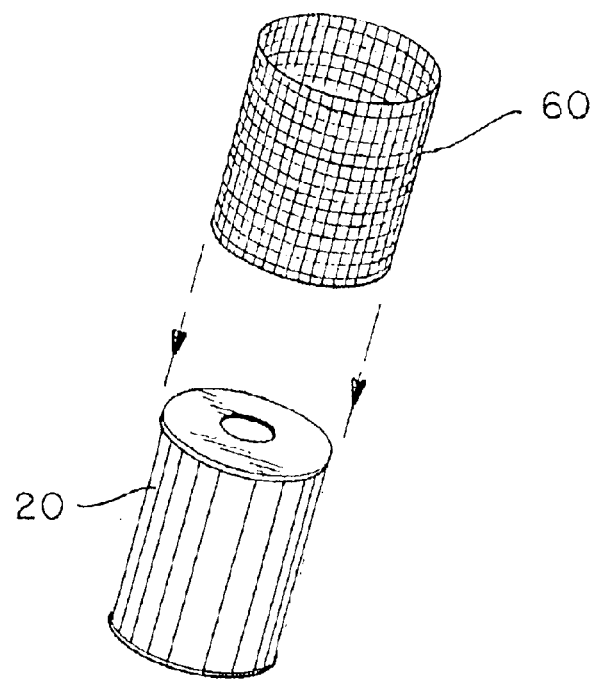
FIG. 6 is a perspective view of an optional surface screen sleeve.

FIG. 6 shows an optional wire or fiberglass screen sleeve that can be slipped on to cover the pleated paper surface of filter 20 for enhanced operation with this rotating filter feature. This tends to keep debris agglomerate from entering between the paper folds where it is more difficult to remove. Without such a rotating feature with continual removal of globs, the screen would just accelerate the clogging of filter 20.

Figure 7:
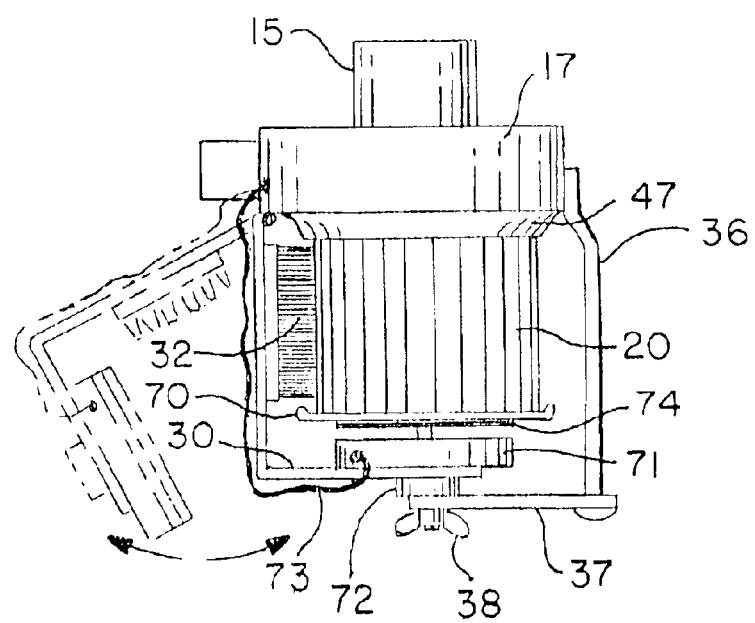
FIG. 7 is a side view of a preferred embodiment of the rotating filter feature, using a separate auxiliary timing motor.

The preferred embodiment of FIG. 7 permits filter 20 to be rotated at an ideal 10 RPM by using a separate timing rotating mechanism, such as gearmotor 71, to perform the rotation function. With this embodiment, there is no need to extend the motor shaft of the impeller motor. Motor 71 is supplied by many manufacturers to drive timing devices. It typically includes an AC synchronous motor attached to a multi-stage gear train. They are used in large volume applications insuring low cost manufacture. A drive plate 74 with a high friction elastomeric surface drives the rotation of filter 20 through contact friction with end cap 70 which now simply fits into the end of column 48 by friction fit. Motor 71 is attached to hinged bracket 30 as is threaded nut 72. Electrical connection to motor 71 is via flexible cable 73 attached to bracket 30. Bracket 30 with motor 71 swings out of the way for filter 20 replacement. Bracket 37 is swung over and locked in place by screwing captive thumb screw 38 into nut 72 for assembly after filter replacement.

While foregoing description refers to a SHOP VAC® type of wet/dry vacuum cleaner, it is anticipated that the rotating filter is applicable to other types of vacuum cleaners or filtering devices having a filter capable of bring rotated.

In the foregoing description, certain terms and visual depictions are used to illustrate the preferred embodiment.

However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended claims.

I claim:

1. A wet/dry vacuum cleaner comprising:
   a debris collection drum having a top opening;
   a power head covering the top opening of said collection drum having an inlet and an outlet;
   means comprising a rotating filter for filtering dust laden air suspended from said power head extending into said collection drum;
   said power head having an impeller to draw dust laden air through said inlet into said collection drum, through said filtering means for removing particulate from said dust laden air and discharging said air through said outlet;
   said power head including an electric motor for driving said impellet and said filter; and
   means for cleaning said filter while said vacuum cleaner is in operation comprising a stationary blade for scraping an outer surface of said filter while rotating to remove accumulated globs of debris from said outer surface of said filter and drop said debris into said collection drum.

2. The wet/dry vacuum cleaner of claim 1 having a baffle within said collection drum adjacent said inlet to cause any water droplets present in the dust laden air to drop said collection drum.

3. The wet/dry vacuum cleaner of claim 1 in which said filtering means includes a rotating support cylinder with perforations said filter surrounding said support cylinder, said support cylinder having an internal opening communicating with said impeller so that air passing through an outer surface of said filter into said support cylinder passes through said impeller and exhausts through said outlet.

4. The wet/dry vacuum cleaner of claim 3 in which an impeller shaft extends from motor down through said internal opening and out through a bottom of said support cylinder, said support cylinder having a base flange at a top end and a filter cap at a bottom end for sandwiching said filter therebetween, said support cylinder with base flange, filter cap and filter rotating as an assembly.

5. The wet/dry vacuum cleaner of claim 1 in which said filter is mounted in side of a screen sleeve to enclose a pleated surface of said filter to retain debris outside of folds in said filter.

6. The wet/dry vacuum cleaner of claim 3 in which said support cylinder has a base flange at a top end and a filter cap at a bottom end for sandwiching said filter therebetween, said support cylinder with base flange filter cap and filter rotating as an assembly.

7. The wet/dry vacuum cleaner comprising:

a debris collection drum having a top opening;

a power head covering the top opening of said collection drum having an inlet and an outlet;

means for filtering dust laden air suspended from said power head extending into said collection drum;

said power head having an impeller to draw dust laden air through said inlet into said collection drum, through said filtering means for removing particulate from said dust laden air and discharging said air through said outlet;

an electric motor for driving said impeller;

said filtering means comprising a rotating filter; and a stationary blade for scraping an outer surface of said filter while rotating to remove accumulated globs of debris from said outer surface of said filter and drop said debris into said collection drum;

said filtering means including a rotating support cylinder with perforations, said filter surrounding said support cylinder, said support cylinder having an internal opening communicating with said impeller so that air passing through an outer surface of said filter into said support cylinder passes through said impeller and exhaust through said outlet;

an impeller shaft extending from motor down through said internal opening and out through a bottom of said support cylinder, said support cylinder having a base flange at a top end and a filter cap at a bottom end for sandwiching said filter therebetween, said support cylinder with base flange, filter cap and filter rotating as an assembly; and a speed reduction gear box connected to said impeller shaft under said filter cap for reducing the rotational speed of said support cylinder and said filter.

8. The wet/dry vacuum cleaner of claim 7 having means to pivot said stationary blade out of contact with said filter for maintenance and repair, said pivot means comprising a pivoted vertical bracket with a first arm to engage a bottom of said gear box.

9. The wet/dry vacuum cleaner of claim 8 having a vertical member joined at one end to an outside of said power head and a second arm attached to another end of said vertical member having a distal end for exerting compression spring force on said filter through said filter cap to keep said filter roughly in place.

10. The wet/dry vacuum cleaner of claim 9 in which said a bottom of gear box has a stud for engaging said first and second arms, and a thumb screw engaged with said stud for tightening said first and second arms to said gear box thereby causing said compression spring force.

11. The wet/dry vacuum cleaner of claim 10 in which said base flange is compressed against a stationary bottom wall of said impeller through a ring thrust bearing to permit rotation of said support cylinder, and a rotating seal between an outer rim of said base flange and the bottom wall of said impeller housing.

12. The wet/dry vacuum cleaner of claim 11 in which said gear box comprises a planetary gear system with a sun gear engaged with said impeller shaft and a ring gear engaged with said filter cap to rotate said support cylinder.

13. A wet/dry vacuum cleaner comprising:

a debris collection drum having a top opening;

a power head covering the top opening of said collection drum having an inlet and an outlet;

means for filtering dust laden air suspended from said power head extending into said collection drum;

said power head having an impeller to draw dust laden air through said inlet into said collection drum through said filtering means for removing particulate from said dust laden air and discharging said air through said outlet;

an electric motor for driving said impeller;

said filtering means comprising a rotating filter, and a stationary blade for scraping an outer surface of said filter while rotating to remove accumulated globs of debris from said outer surface of said filter and drop said debris into said collection drum;

said filtering means including a rotating support cylinder with perforations, said filter surrounding said support cylinder, said support cylinder having an internal opening communicating with said impeller so that air passing through an outer surface of said filter into said support cylinder passes through said impeller and exhausts through said outlet;

said support cylinder having a base flange at a top end and a filter cap at a bottom end for sandwiching said filter therebetween, said support cylinder with base flange, filter cap and filter rotating as an assembly; and a timing gearmotor for reducing the speed of rotation of said support cylinder.

14. The wet/dry vacuum cleaner of claim 13 in which said gearmotor drives said support cylinder through frictional engagement with said filter cap.

15. The wet/dry vacuum cleaner of claim 14 in which said gearmotor is mounted on an end of a hinged bracket movable between a retracted position for swinging said gearmotor out of the way when said filter is replaced and a driving position where said gearmotor is in frictional engagement with said filter cap for rotating said support cylinder.

16. The wet/dry vacuum cleaner of claim 15 having a thumb screw for producing said frictional engagement when said gearmotor is in driving position.

* * * * *